United States Patent
Yi et al.

(10) Patent No.: US 11,818,594 B2
(45) Date of Patent: Nov. 14, 2023

(54) METHOD AND SYSTEM FOR TESTING COVERAGE EFFECT OF VERY HIGH FREQUENCY COMMUNICATION BASE STATION

(71) Applicant: Transport Planning and Research Institute Ministry of Transport, Beijing (CN)

(72) Inventors: Zhongli Yi, Beijing (CN); Chen Kong, Beijing (CN); Shanshan Wang, Beijing (CN); Xuedong Mou, Beijing (CN); Huabao Chen, Beijing (CN); Shengbo Qin, Beijing (CN); Shengli Liu, Beijing (CN); Fuzhai Wang, Beijing (CN); Yanjun Fang, Beijing (CN); Chen Wang, Beijing (CN); Rui Miao, Beijing (CN)

(73) Assignee: Transport Planning and Research Institute Ministry of Transport, Beijing (CN)

( * ) Notice: Subject to any disclaimer, the term of this patent is extended or adjusted under 35 U.S.C. 154(b) by 330 days.

(21) Appl. No.: 17/244,016

(22) Filed: Apr. 29, 2021

(65) Prior Publication Data
US 2022/0022055 A1    Jan. 20, 2022

Related U.S. Application Data

(63) Continuation of application No. PCT/CN2021/075299, filed on Feb. 4, 2021.

(30) Foreign Application Priority Data

Jul. 15, 2020  (CN) .......................... 202010679942.2
Jul. 15, 2020  (CN) .......................... 202010680559.9

(51) Int. Cl.
*H04W 24/00* (2009.01)
*H04W 16/18* (2009.01)

(52) U.S. Cl.
CPC ........... *H04W 24/00* (2013.01); *H04W 16/18* (2013.01)

(58) Field of Classification Search
CPC ............................... H04W 24/00; H04W 16/18
(Continued)

(56) References Cited

U.S. PATENT DOCUMENTS

| 11,650,331 | B2 * | 5/2023 | San .......................... G01S 19/42 |
| | | | 342/357.28 |
| 2007/0010241 | A1 * | 1/2007 | Wachter ................. H04W 24/00 |
| | | | 455/423 |

(Continued)

FOREIGN PATENT DOCUMENTS

| CN | 102333334 A | 1/2012 |
| CN | 102740324 A | 10/2012 |

(Continued)

*Primary Examiner* — Mong-Thuy T Tran
(74) *Attorney, Agent, or Firm* — Westbridge IP LLC

(57) ABSTRACT

The present application provides a method for testing the coverage effect of a VHF communication base station, including: a server sending preset test parameter information to a mobile station, sending a first start test instruction to the mobile station and at least one base station, and receiving first audio data and first location information sent by the at least one base station, and second audio data and second location information sent by the mobile station. By using the mobile stations to send or receive audio data at different distances to a temporary VHF communication base station, it is possible to accurately determine a coverage distance of the temporary VHF communication base station and a transmission effect of the audio data at different communication distances.

9 Claims, 5 Drawing Sheets

(58) Field of Classification Search
USPC .......................................................... 455/424
See application file for complete search history.

(56) References Cited

U.S. PATENT DOCUMENTS

| | | | | |
|---|---|---|---|---|
| 2014/0011496 A1* | 1/2014 | Elliott | .................... | H04B 17/18 455/424 |
| 2015/0325129 A1 | 11/2015 | Simonin et al. | | |
| 2016/0018505 A1 | 1/2016 | Yu et al. | | |

FOREIGN PATENT DOCUMENTS

| CN | 103701542 A | | 4/2014 |
|---|---|---|---|
| CN | 103439687 B | * | 9/2015 |
| CN | 205901798 U | * | 1/2017 |

* cited by examiner

A server sending a preset test parameter information to a mobile station and sending a first start test instruction to the mobile station and at least one base station, in which the preset test parameter information is a parameter for receiving or sending audio data to be tested, and the first start test instruction is used to instruct the mobile station and the at least one base station to start receiving or sending the audio data to be tested and location information corresponding to the audio data to be tested  — 101

Receiving first audio data and first location information sent by the at least one base station, and a second audio data and second location information sent by the mobile station, in which the first location information is information of a location where the at least one base station is when the at least one base station receives the first audio data, and the second location information is information of a location where the mobile station is when the mobile station receives the second audio data  — 102

Sending the first audio data, the first location information, the second audio data and the second location information received to a management system, so that the management system scores the first audio data and the second audio data  — 103

FIG. 1

The server receiving the first audio data and the first location information sent by the base station  — 201

The server receiving the second audio data and the second location information sent by the mobile station  — 202

FIG. 2

The server adjusting the preset test parameter information according to an adjustment information input by a user  — 301

The server sending adjusted preset test parameter information and a second start test instruction to the mobile station  — 302

FIG. 3

METHOD AND SYSTEM FOR TESTING COVERAGE EFFECT OF VERY HIGH FREQUENCY COMMUNICATION BASE STATION

CROSS-REFERENCE TO RELATED APPLICATIONS

The present application is a continuation of International Application No. PCT/CN2021/075299 filed on Feb. 4, 2021, which claims priority to Chinese patent applications Nos. 202010680559.9 and 202010679942.2 filed on Jul. 15, 2020. All applications are incorporated herein by reference in their entireties.

TECHNICAL FIELD

The present application relates to the field of wireless communication technology, in particular to a method and a system for testing a coverage effect of a Very High Frequency (VHF) communication base station, as well as an electronic device and a computer readable storage medium.

BACKGROUND

VHF communication is a wireless communication with a wavelength of 1 to 10 meters and a frequency of 30 to 300 MHz, and mainly transmits information in a form of space waves. That is, the information is propagated along a straight path within a visual line of sight. It is not affected by changes of an ionosphere. Its transmission is stable and its communication is reliable, but its transmission distance is short, and thus measures such as increasing an antenna installation height of the VHF communication base station and relaying information between multiple VHF communication base stations are required to increase a communication distance. Therefore, a layout of the VHF communication base station is very important. At present, design and layout of the VHF communication base stations rely on previous construction experience, and in an engineering consultation and design stage, it is impossible to accurately determine a communication coverage distance and a call effect of the VHF communication base station after it is constructed.

SUMMARY

In view of this, embodiments of the present application provide a method and a system for testing a coverage effect of a VHF communication base station, as well as an electronic device and a computer readable storage medium to solve a problem that in an engineering consultation and design stage, it is impossible to accurately determine a communication coverage distance and a call effect of the VHF communication base station after it is constructed.

According to a first aspect, an embodiment of the present application provides a method for testing a coverage effect of a VHF communication base station, including: sending, by a server, preset test parameter information to a mobile station and sending a first start test instruction to the mobile station and at least one base station, in which the preset test parameter information is a parameter for receiving or sending audio data to be tested, and the first start test instruction is used to instruct the mobile station and the at least one base station to start receiving or sending the audio data to be tested and location information corresponding to the audio data to be tested; and receiving, by the server, first audio data and first location information sent by the at least one base station, and second audio data and second location information sent by the mobile station, in which the first location information is information of a location where the at least one base station is when the at least one base station receives the first audio data, and the second location information is information of a location where the mobile station is when the mobile station receives the second audio data.

In an embodiment, the at least one base station includes a plurality of base stations, and the server receiving first audio data and first location information sent by the at least one base station, and second audio data and second location information sent by the mobile station include: receiving, by the server, the first audio data and the first location information sent by the base station; and receiving, by the server, the second audio data and the second location information sent by the mobile station.

In an embodiment, the base station includes a shore station system, the mobile station includes a ship station system, and after the server receiving first audio data and first location information sent by the at least one base station, and second audio data and second location information sent by the mobile station, the method further includes: sending, by the server, the first audio data, the first location information, the second audio data and the second location information received to a management system, so that the management system scores the first audio data and the second audio data.

In an embodiment, a server sending preset test parameter information to a mobile station includes: sending, by the server, a preset moving route and a preset test time interval to the mobile station, so that the mobile station moves according to the preset moving route, and starts a test again after suspending the test according to the preset test time interval.

In an embodiment, the method for testing the coverage effect of the VHF communication base station further includes: adjusting, by the server, the preset test parameter information according to adjustment information input by a user; and sending, by the server, adjusted preset test parameter information and a second start test instruction to the mobile station.

In an embodiment, the method for testing the coverage effect of the VHF communication base station further includes: receiving, by the server, real-time location information sent by the mobile station for displaying the real-time location information on a map; and sending, by the server, the map to the mobile station and the at least one base station, the map containing the real-time location information sent by the mobile station and the at least one base station.

According to a second aspect, an embodiment of the present application provides a method for testing a coverage effect of a VHF communication base station, including: receiving, by at least one base station, a first start test instruction sent by a server and first audio data sent by a mobile station, and sending the first audio data and first location information to the server, in which the first location information is information of a location where the at least one base station is when the at least one base station receives the first audio data; and sending, by the at least one base station, second audio data to the mobile station; in which the first start test instruction is used to instruct to start receiving or sending audio data to be tested and location information corresponding to the audio data to be tested.

According to a third aspect, an embodiment of the present application provides a method for testing a coverage effect of a VHF communication base station, including: receiving, by a mobile station, preset test parameter information and a first start test instruction sent by a server, in which the preset test parameter information is a parameter for receiving or sending audio data to be tested; moving, by the mobile station, according to the preset test parameter information and the first start test instruction; sending, by the mobile station, first audio data to at least one base station, and receiving second audio data sent by the at least one base station; and sending, by the mobile station, the second audio data and second location information to the server, in which the second location information is information of a location where the mobile station is when the mobile station receives the second audio data.

In an embodiment, the at least one base station includes a plurality of base stations, and the moving according to the preset test parameter information and the first start test instruction include: moving and scanning the plurality of base stations according to the preset test parameter information and the first start test instruction, and numbering the plurality of base stations which have been scanned, so that the plurality of base stations are tested separately according to the numbering; in which the sending first audio data to at least one base station, and receiving second audio data sent by the at least one base station includes: cyclically executing the following steps according to the number of the plurality of base stations: determining whether there is an untested base station; if yes, sending the first audio data to the untested base station, and receiving the second audio data sent by the untested base station; if not, suspending the test.

In an embodiment, after the suspending the test, the method further includes: determining, by the mobile station, whether an end point is reached according to the preset test parameter information; if not, continuing to move according to the preset test parameter information, sending the first audio data to the at least one base station, and receiving the second audio data sent by the at least one base station; and sending the second audio data and the second location information to the server.

In an embodiment, receiving, by the mobile station, preset test parameter information sent by a server includes: receiving, by the mobile station, a preset moving route and a preset test time interval sent by the server; moving, by the mobile station, according to the preset test parameter information and the first start test instruction includes: moving, by the mobile station, according to the preset moving route when the mobile station receives the first start test instruction; and after the suspension test, the method includes: starting, by the mobile station, the test again according to the preset test time interval.

In an embodiment, the method for testing the coverage effect of the VHF communication base station further includes: receiving, by the mobile station, the adjusted preset test parameter information and a second start test instruction sent by the server; and continuing, by the mobile station, to move according to the adjusted preset test parameter information and the second start test instruction.

In an embodiment, the method for testing the coverage effect of the VHF communication base station further includes: sending, by the mobile station, real-time location information to the server for displaying the real-time location information on a map by the server; and receiving, by the mobile station, the map sent by the server, in which the map contains real-time location information sent by the mobile station and the at least one base station.

In an embodiment, the mobile station includes a berth system, the base station includes a shore station system, and the first audio data and the second audio data is used to evaluate the VHF communication coverage effect of the mobile station, so as to assist a design of the VHF communication system.

According to a forth aspect, an embodiment of the present application provides a system of testing a coverage effect of a VHF communication base station, including: a server, configured to: send preset test parameter information to a mobile station and send a first start test instruction to the mobile station and at least one base station, in which the preset test parameter information is a parameter for receiving or sending audio data to be tested, and the first start test instruction is used to instruct the mobile station and the at least one base station to start receiving or sending the audio data to be tested and location information corresponding to the audio data to be tested; and receive first audio data and first location information sent by the at least one base station, and second audio data and second location information sent by the mobile station, in which the first location information is information of a location where the at least one base station is when the at least one base station receives the first audio data, and the second location information is information of a location where the mobile station is when the mobile station receives the second audio data; a mobile station, configured to: receive preset test parameter information and a first start test instruction sent by a server, in which the preset test parameter information is a parameter for receiving or sending audio data to be tested; move according to the preset test parameter information and the first start test instruction; send first audio data to at least one base station, receive second audio data sent by the at least one base station; and send the second audio data and second location information to the server, in which the second location information is information of a location where the mobile station is when the mobile station receives the second audio data; at least one base station, configured to: receive a first start test instruction sent by a server and first audio data sent by a mobile station, send the first audio data and first location information to the server, in which the first location information is information of a location where the at least one base station is when the at least one base station receives the first audio data; and send second audio data to the mobile station, in which the first start test instruction is used to instruct to start receiving or sending audio data to be tested and location information corresponding to the audio data to be tested; and a management system, configured to: receive the first audio data, the first location information, second audio data and the second location information, so as to score the first audio data and the second audio data.

According to a fifth aspect, an embodiment of the present application provides an electronic device, including: a processor; and a memory storing a computer program instruction. When the computer program instruction is executed by the processor, the processor executes the method for testing the coverage effect of the VHF communication base station according to any one of the above embodiments.

According to a sixth aspect, an embodiment of the present application provides a computer readable storage medium storing a computer program instruction. When the computer program instruction is executed by the processor, the processor executes the method for testing the coverage effect of the VHF communication base station according to any one of the above embodiments.

Embodiments of the present application provide a method and system for testing a coverage effect of a VHF communication base station, as well as an electronic device and a computer readable storage medium. By using the mobile stations to send or receive audio data at different distances to a temporary VHF communication base station, it is possible to accurately determine a coverage distance of the temporary VHF communication base station and a transmission effect of the audio data at different communication distances. That is, by testing the coverage distance and an call effect of the temporary VHF communication base station, in an engineering consultation and design stage, it is possible to accurately determine the communication coverage distance and the call effect of the VHF communication base station of the VHF communication base station after it is constructed, and provide a reference for a layout of the VHF communication base station.

BRIEF DESCRIPTION OF DRAWINGS

FIG. 1 is a flow diagram of a method for testing a coverage effect of a VHF communication base station according to an embodiment of the present application.

FIG. 2 is a flow diagram of a method for testing a coverage effect of a VHF communication base station according to another embodiment of the present application.

FIG. 3 is a flow diagram of a method for testing a coverage effect of a VHF communication base station according to another embodiment of the present application.

DETAILED DESCRIPTION OF THE EMBODIMENTS

Figure 4:
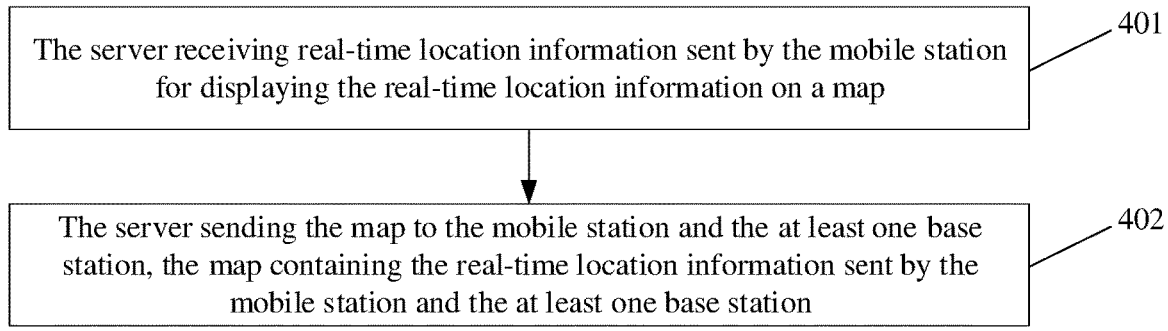
FIG. 4 is a flow diagram of a method for testing a coverage effect of a VHF communication base station according to another embodiment of the present application.

The technical schemes in the embodiments of the present disclosure will be described clearly and completely below in combination with the accompanying drawings in the embodiments of the present disclosure. Obviously, the described embodiments are only a part of the embodiments of the present disclosure, not all of the embodiments. Based on the embodiments in the present disclosure, all other embodiments obtained by those skilled in the art without creative efforts shall fall within the protection scope of the present disclosure.

As described above, a reason why the existing design and layout of the VHF communication base station need to rely on previous construction experience to carry out the design and layout and there is a problem that in an engineering consultation and design stage, it is impossible to accurately determine a communication coverage distance and a call effect of the VHF communication base station of the VHF communication base station after it is constructed is mainly because different geographical locations, surrounding environment and other factors have a great impact on the communication coverage distance and the call effect of the VHF communication base station. For example, when referring to a layout of the VHF communication base stations in the past, it is necessary to refer to a layout of the VHF communication base stations with similar factors such as geographic location and surrounding environment. However, it is difficult to find a layout of the VHF communication base station that have exactly the same geographical location and surrounding environment, and the geographical location, surrounding environment and other factors are relatively complicated and difficult to quantify. Therefore, designing a layout by referring to a previous layout experience of the VHF communication base stations may cause relatively large errors.

In view of the above technical problems, a basic concept of this application is to provide a method and system for testing a coverage effect of a VHF communication base station, as well as an electronic device and a computer readable storage medium. By using the mobile stations to send or receive audio data at different distances to a temporary VHF communication base station, it is possible to accurately determine a coverage distance of the temporary VHF communication base station and a transmission effect of the audio data at different communication distances. That is, by testing the coverage distance and an call effect of the temporary VHF communication base station, it is possible to accurately determine the communication coverage distance and the call effect of the VHF communication base station after the VHF communication base station been constructed in an engineering consultation and design stage, and provide a reference for a layout of the VHF communication base station.

After introducing the basic principle of the present application, various non-limiting embodiments of the present application will be described in detail below with reference to the accompanying drawings.

FIG. 1 is a flow diagram of a method for testing a coverage effect of a VHF communication base station according to an embodiment of the present application. As shown in FIG. 1, a method for testing a coverage effect of a VHF communication base station includes the following steps.

101: sending, by a server, a preset test parameter information to a mobile station and sending a first start test instruction to the mobile station and at least one base station, in which the preset test parameter information is a parameter for receiving or sending audio data to be tested, and the first start test instruction is used to instruct the mobile station and the at least one base station to start receiving or sending the audio data to be tested and location information corresponding to the audio data to be tested.

Specifically, the server sends the preset test parameter information to the mobile station, and sends the first start test instruction to the mobile station and at least one base station. The server may be a computer, a server, a server cluster composed of several servers, or a cloud computing service center, etc. The preset test parameter information and the first start test instruction may be sent at the same time or sequentially. For example, the preset test parameter information may be sent first, and then the first start test instruction may be sent, or the first start test instruction may be sent first, and then the preset test parameter information may be sent. The mobile station may be in a moving state all the time and receive the preset test parameter information sent by the server during the movement, or it may stop after moving for a certain distance to receive the preset test parameter information sent by the server. The base station may be a VHF communication base station temporarily constructed for testing.

In an embodiment, the server sending the preset test parameter information to the mobile station includes: the server sending a preset moving route and a preset test time interval to the mobile station. The preset moving route is a route pre-planned by the server that the mobile station needs to take and where to receive or send audio data. The preset moving route is sent to the mobile station to guide the mobile station to move according to the preset moving route, and to receive or send audio data to be tested. The preset test time interval is a time that the server pre-designed to pause between testing a set of data and starting to test a next set of data. For example, a set of data may be multiple audio data sent and received between the mobile station and multiple base stations and the corresponding location information. Since the preset moving route may be longer, the test time may be longer. For example, a test may last more than ten days or dozens of days. If the test is performed continuously, the test data received is relatively large. Therefore, it is necessary to suspend the preset test time interval between each set of tests, so that each set of tests may obtain a relatively small test data relative to uninterrupted tests. In addition, a VHF channel only allow one device to occupy the channel at the same time. That is, if a mobile station and a base station are tested continuously, other ships that are normally sailing within the test range may not use the VHF channel to talk. Moreover, radio waves in a VHF band usually have a certain degree of diffraction ability. Generally, there is little or almost no difference in test results in a short period of time. Therefore, an accurate test results may be obtained without repeating repeated uninterrupted tests on the same base station.

102: receiving first audio data and first location information sent by the at least one base station, and second audio data and second location information sent by the mobile station, in which the first location information is information of a location where the at least one base station is when the at least one base station receives the first audio data, and the second location information is information of a location where the mobile station is when the mobile station receives the second audio data.

Specifically, after the server sends the first start test instruction to the mobile station and the at least one base station, the mobile station and the at least one base station start to transmit audio data to each other. That is, the mobile station will send the first audio data to the base station, and then after the base station receives the first audio data, it will send the first audio data received and the location information when receiving the first audio data to the server. That is, the first audio data received and the first location information are sent to the server. Similarly, the base station will also send the second audio data to the mobile station, and then after the mobile station receives the second audio data, it will send the second audio data received and the location information when receiving the second audio data to the server. That is, the second audio data received and the second location information are sent to the server. The communication coverage distance and the call effect of the VHF communication base station temporarily constructed may be determined by analyzing a quality of the multiple first audio data and the multiple second audio data, so as to provide a reference for a layout of the VHF communication base station.

In an embodiment, the base station may be a shore station system, and the mobile station may be a ship station system. That is, the base station may be the shore station system temporarily built on shore, and the mobile station may be the ship station system carried by a ship sailing in the water. After receiving first audio data and first location information sent by the at least one base station, and second audio data and second location information sent by the mobile station, the method further includes:

103: sending the first audio data, the first location information, the second audio data and the second location information received to a management system, so that the management system scores the first audio data and the second audio data.

Specifically, after the management system receives the first audio data, the first location information, the second audio data and the second location information sent by the server, the management system may classify the first audio data, the first location information, the second audio data, and the second location information received according to different test time periods, different base stations and other information, and score the first audio data and the second audio data.

Table 1 shows a MOS evaluation rating table.

TABLE 1

| Score | Mean opinion score (MOS) | Distortion level |
|---|---|---|
| 5 | Excellent | Unaware |
| 4 | Good | A little aware |
| 3 | Medium | Aware and obnoxious |
| 2 | Bad | Aware and obnoxious, but tolerable |
| 1 | Very bad | Intolerable |

Specifically, the mean opinion score (MOS) method may be used to score audio data. MOS may use a five-level scoring standard shown in Table 1. For example, multiple testers score a same audio data, and then the management system averages all the scores obtained from the same audio data to obtain the MOS of the audio data. The audio data may also be scored by the management system through a machine learning algorithm, and then the management system averages all the scores obtained from the same audio data to obtain the MOS of the audio data. This present application does not specifically limit a way to score the audio data.

In an embodiment, sending the first audio data, the first location information, the second audio data and the second location information received to a management system includes: formatting the first location information received and synthesizing a composite file with the first audio data, formatting the second location information received and synthesizing a composite file with the second audio data, thereby obtaining multiple composite files, and sending the multiple composite files to the management system. By formatting the first location information and the second location information and synthesizing a composite file with the corresponding first audio data and second audio data, the first location information and the first audio data of the at least one base station and the second location information and the second audio data of the mobile station may be displayed well, for example, on a map.

Specifically, after converting the first location information into a LRC format and synthesizing with the first audio data, and converting the second location information into a LRC format and synthesizing with the second audio data, The location of the at least one base station and the mobile station and the corresponding audio data file may be saw intuitively on the map.

FIG. 2 is a flow diagram of a method for testing a coverage effect of a VHF communication base station according to another embodiment of the present application. The at least one base station includes a plurality of base stations. As shown in FIG. 2, the server receiving first audio data and first location information sent by the at least one base station, and second audio data and second location information sent by the mobile station include the following steps.

Performing the following steps for each of the multiple base stations:

201: receiving, by the server, the first audio data and the first location information sent by the base station.

202: receiving, by the server, the second audio data and the second location information sent by the mobile station.

Specifically, a mobile station may test multiple base stations. For example, the mobile station sends the first audio data to a first base station. After receiving the first audio data, the first base station sends the first audio data received and the location information when the first audio data is received to the server. That is, the first audio data received and the first location information are sent to the server. Then, the first base station may also send the second audio data to the mobile station. After receiving the second audio data, the mobile station sends the second audio data received and the location information when the second audio data is received to the server. That is, the second audio data received and the second location information are sent to the server. The mobile station and the first base station send each other the audio data to be tested, and send the first audio data, the first location information, the second audio data and the second location information which are respectively received to the server to complete the test of the first base station. Then use the same method to test a second base station until all base stations are tested. By using one mobile station to test multiple base stations, there is no need to use multiple mobile stations, which reduces a test cost and at the same time improves a test efficiency of the base station.

FIG. 3 is a flow diagram of a method for testing a coverage effect of a VHF communication base station according to another embodiment of the present application. As shown in FIG. 3, the method for testing the coverage effect of the VHF communication base station further includes the following steps.

301: adjusting, by the server, the preset test parameter information according to adjustment information input by a user.

Specifically, if the user wants to change the preset test parameter information during the test, he may input adjustment information required on the server. The server will correspondingly adjust the preset test parameter information according to the adjustment information input by the user. For example, if the user wants to change a current moving route of the mobile station, he may input a new moving route in the server, and then the server will automatically adjust the preset moving route.

302: sending, by the server, adjusted preset test parameter information and a second start test instruction to the mobile station.

Specifically, after the server adjusts the preset test parameter information, it will send the adjusted preset test parameter information to the mobile station, and send the second start test instruction to the mobile station, so that the mobile station performs the test according to the adjusted preset test parameter information. For example, the server adjusts the preset moving route, and after receiving the adjusted preset test parameter information and the second start test instruction, the mobile station will move according to an adjusted preset moving route. The user may input the adjustment information on the server at any time, so as to control the test process at any time.

FIG. 4 is a flow diagram of a method for testing a coverage effect of a VHF communication base station according to another embodiment of the present application. As shown in FIG. 4, the method for testing the coverage effect of the VHF communication base station further includes the following steps.

401: receiving, by the server, real-time location information sent by the mobile station for displaying the real-time location information on a map.

Specifically, the server may receive the real-time location information sent by the mobile station and the at least one base station, and display the real-time location information of the mobile station and the at least one base station on a map, so that the location of the mobile station and the at least one base station may be seen Intuitively and in real-time on the map of the server.

402: sending, by the server, the map to the mobile station and the at least one base station, the map containing the real-time location information sent by the mobile station and the at least one base station.

Specifically, the server sends a map containing the real-time location information of the mobile station and the at least one base station to the mobile station and the at least one base station, so that the locations of the mobile station and the at least one base station may also be seen intuitively and in real-time at the mobile station and the at least one base station.

Figure 5:
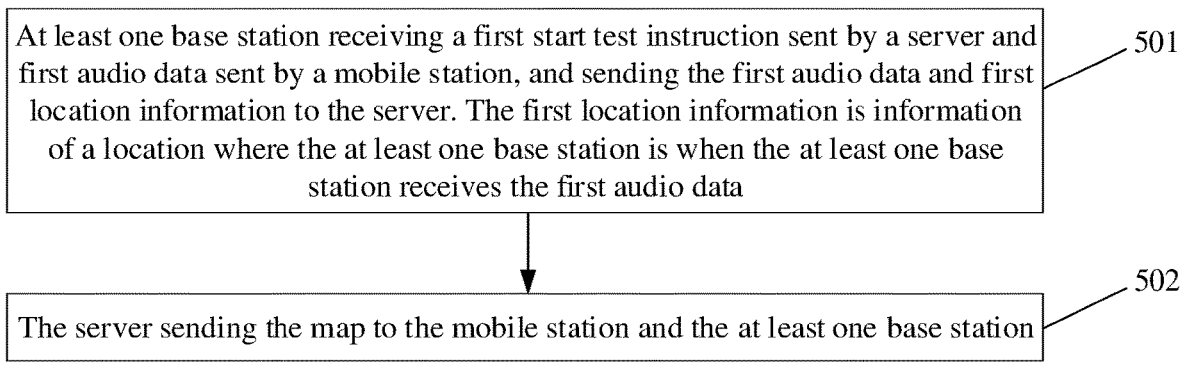
FIG. 5 is a flow diagram of a method for testing a coverage effect of a VHF communication base station according to another embodiment of the present application.

FIG. 5 is a flow diagram of a method for testing a coverage effect of a VHF communication base station according to another embodiment of the present application. As shown in FIG. 5, the method for testing the coverage effect of the VHF communication base station includes the following steps.

501: receiving, by at least one base station, a first start test instruction sent by a server and first audio data sent by a mobile station, and sending the first audio data and first location information to the server. The first location information is information of a location where the at least one base station is when the at least one base station receives the first audio data.

As a corresponding terminal of the server in FIG. 1, a specific description may refer to a description of the method in FIG. 1, which will not be repeated here.

502: sending, by the server, the map to the mobile station and the at least one base station.

A specific description may refer to a description of the method in FIG. 1, which will not be repeated here.

Figure 6:
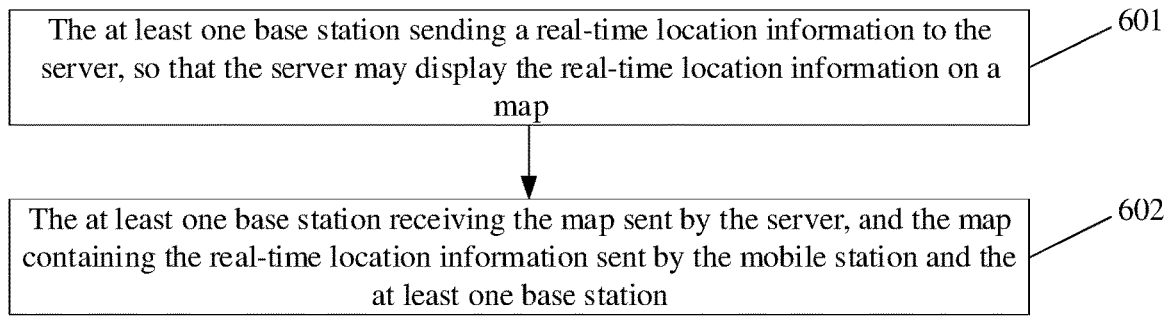
FIG. 6 is a flow diagram of a method for testing a coverage effect of a VHF communication base station according to another embodiment of the present application.

FIG. 6 is a flow diagram of a method for testing a coverage effect of a VHF communication base station according to another embodiment of the present application. As shown in FIG. 6, the method for testing the coverage effect of the VHF communication base station further includes the following steps.

601: sending, by the at least one base station, real-time location information to the server, so that the server may display the real-time location information on a map.

As a corresponding terminal of the server in FIG. 4, a specific description may refer to a description of the method in FIG. 4, which will not be repeated here.

602: receiving, by the at least one base station, the map sent by the server, and the map containing the real-time location information sent by the mobile station and the at least one base station.

A specific description may refer to a description of the method in FIG. 4, which will not be repeated here.

Figure 7:
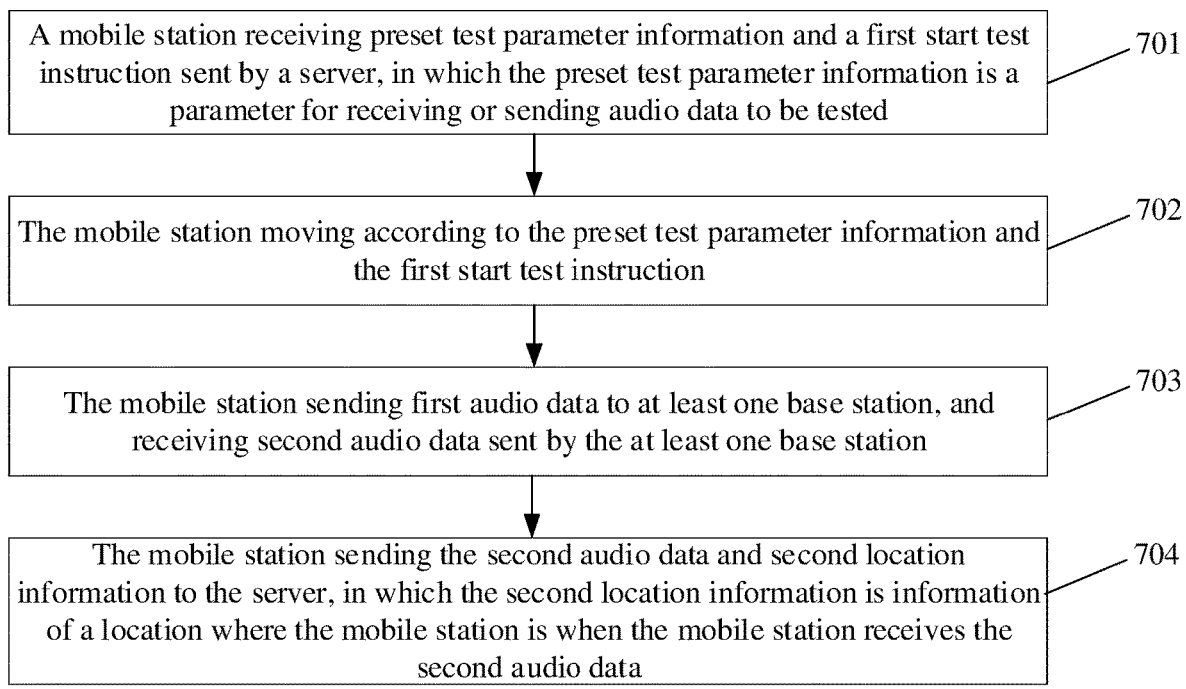
FIG. 7 is a flow diagram of a method for testing a coverage effect of a VHF communication base station according to another embodiment of the present application.

FIG. 7 is a flow diagram of a method for testing a coverage effect of a VHF communication base station according to another embodiment of the present application. As shown in FIG. 7, the method for testing the coverage effect of the VHF communication base station further includes the following steps.

701: receiving, by a mobile station, preset test parameter information and a first start test instruction sent by a server, in which the preset test parameter information is a parameter for receiving or sending audio data to be tested.

In an embodiment, receiving the preset test parameter information sent by the server further includes: receiving a selecting test base station principle and a preset audio data to be tested sent by the server. The selecting test base station principle is used to guide the mobile station to determine several groups of base stations that need to be tested at current location. For example, a total of 100 base stations need to be tested. After scanning, the mobile station finds that there are 5 base stations within 60 kilometers from the mobile station, and the mobile station conducts communication tests on the 5 base stations in turn. The preset audio to be tested is a piece of standard audio data to be tested used in a test preset by the server.

702: moving, by the mobile station, according to the preset test parameter information and the first start test instruction.

Specifically, after receiving the preset test parameter information and the first start test instruction, the mobile station will move according to specific preset test parameter information, for example, moving according to a preset moving route.

In an embodiment, the preset test parameter information includes a preset moving route and a preset test time interval. The mobile station moving according to the preset test parameter information and the first start test instruction includes: moving, by the mobile station, according to the preset moving route when it receives the first start test instruction.

703: sending, by the mobile station, first audio data to at least one base station, and receiving second audio data sent by the at least one base station.

704: sending by the mobile station, the second audio data and second location information to the server, in which the second location information is information of a location where the mobile station is when the mobile station receives the second audio data.

The mobile station in steps 701 to 704 serves as corresponding terminals of the server in FIG. 1. and a specific description may refer to a description of the method in FIG. 1, which will not be repeated here.

Figure 8:
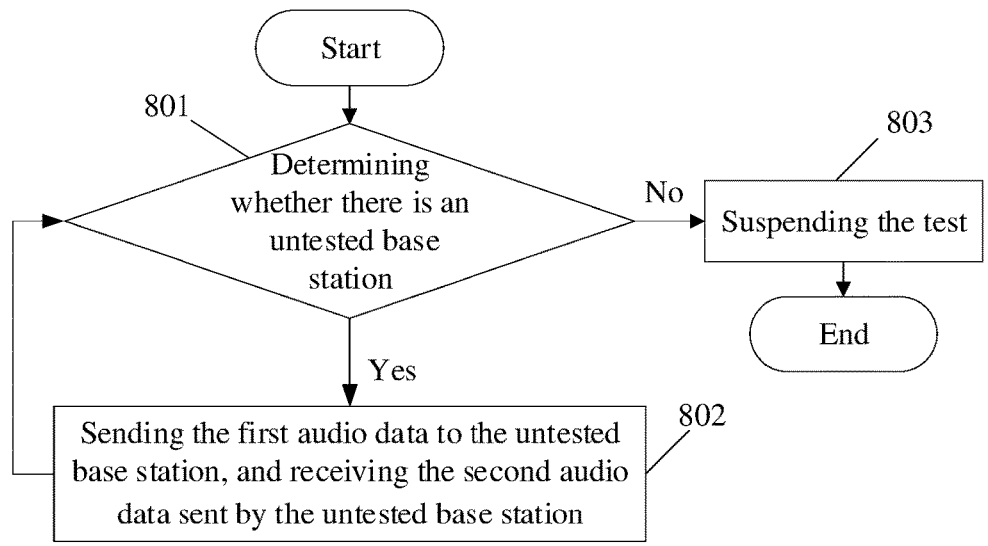
FIG. 8 is a flow diagram of a method for testing a coverage effect of a VHF communication base station according to another embodiment of the present application.

FIG. 8 is a flow diagram of a method for testing a coverage effect of a VHF communication base station according to another embodiment of the present application. The at least one base station includes a plurality of base stations, and the moving according to the preset test parameter information and the first start test instruction include: moving and scanning the plurality of base stations according to the preset test parameter information and the first start test instruction, and numbering the plurality of base stations which have been scanned, so that the plurality of base stations are tested separately according to the numbering.

Specifically, the mobile station may scan the base stations during the movement, and number the multiple base stations that are scanned, so that the multiple base stations will be tested separately according to the numbers. The mobile station may also stop after moving a certain distance, and then scan the base station. Numbering multiple base stations may be numbered according to a sequence of the scanned base stations. For example, a number of a first scanned base station is number 1, a number of a second scanned base station is number 2, and so on. Numbering multiple base stations may also be numbered according to positions of the scanned base stations. For example, a number nearest to the mobile station is 1, and a number farthest from the mobile station is the last number. It should be understood that numbering of multiple base stations may also be numbered according to other factors, and this present application does not make specific limitations.

The sending first audio data to at least one base station, and receiving second audio data sent by the at least one base station includes the following steps.

Cyclically executing the following steps according to the number of the plurality of base stations:

801: determining whether there is an untested base station.

Specifically, the mobile station needs to determine whether all the scanned base stations have been tested after the mobile station and a base station receive and send audio data to each other.

802: if yes, sending the first audio data to the untested base station, and receiving the second audio data sent by the untested base station.

Specifically, if there are the untested base stations among the scanned base stations, the mobile station will send the first audio data to the untested base stations according to the number. That is, if the base stations numbered 3, 4, and 5 have not been tested, the mobile station will first send the first audio data to the base station 3, and receive the second audio data sent by the untested base station. Then, after the test of base station numbered 3 is completed, the mobile station will continue to determine whether there are the untested base stations. If there are base stations numbered 4 and 5 that have not been tested, the mobile station will send the first audio data to the base station numbered 4, and receive the second audio data sent by the untested base station, and so on.

803: if not, suspending the test.

Specifically, if there is no the untested base station among the scanned base stations, the mobile station will suspend the test according to the preset test parameter information.

In an embodiment, the preset test parameter information includes: a preset moving route and a preset test time interval. After the test is suspended, the method for testing the coverage effect of the VHF communication base station further includes: the mobile station restarting the test according to the preset test time interval. The mobile station will suspend the test according to the preset test time interval.

For example, if the preset test time interval is five minutes, the mobile station will suspend the test for five minutes. It should be understood that the preset test time interval may be selected according to specific application requirements, and this present application does not specifically limit the preset test time interval.

Figure 9:
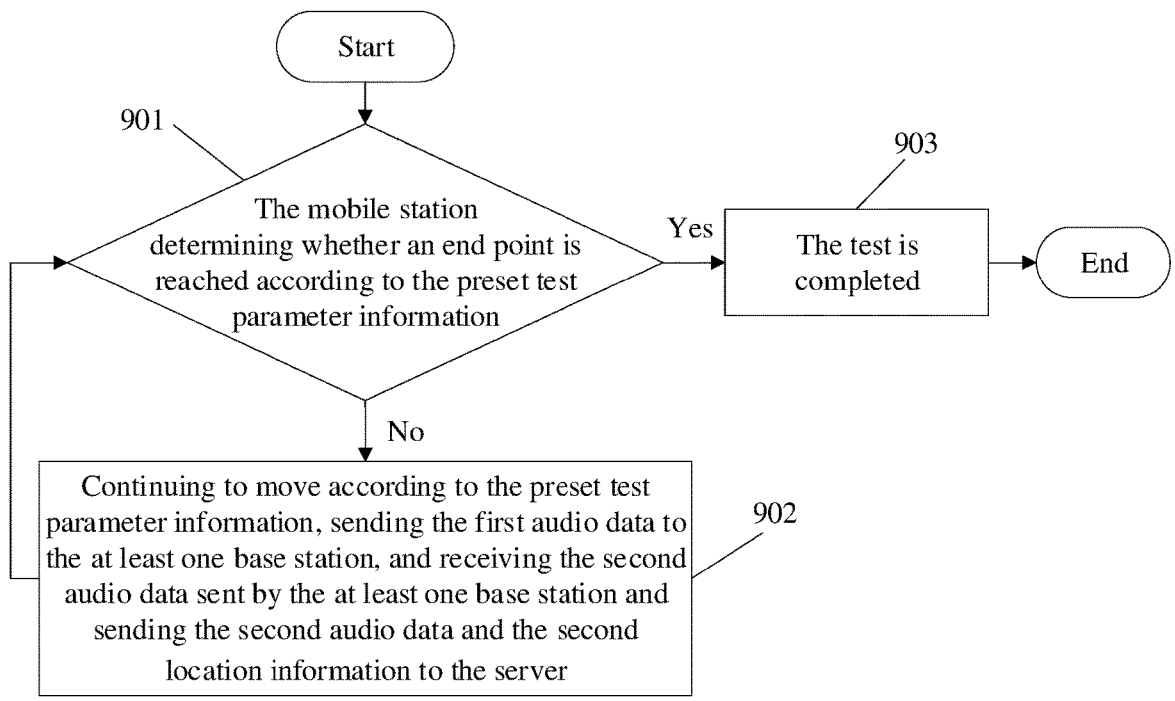
FIG. 9 is a flow diagram of a method for testing a coverage effect of a VHF communication base station according to another embodiment of the present application.

FIG. 9 is a flow diagram of a method for testing a coverage effect of a VHF communication base station according to another embodiment of the present application. As shown in FIG. 9, after the test is suspended, the method further includes the following steps.

901: determining, by the mobile station, whether an end point is reached according to the preset test parameter information.

Specifically, the preset test parameter information may be a preset moving route, and the mobile station may determine whether it has moved to the end point according to the preset moving route. The preset test parameter information may also be a longitude and latitude coordinates of a preset end position. The mobile station may determine whether the end point is reached by determining whether its own longitude and latitude coordinates are the same as the longitude and latitude coordinates of the preset end position.

902: if not, continuing to move according to the preset test parameter information, sending the first audio data to the at least one base station, and receiving the second audio data sent by the at least one base station and sending the second audio data and the second location information to the server.

Specifically, if the mobile station does not reach the end point, it can continue to move and continue to test the base station.

903: if yes, the test is completed.

Specifically, if the mobile station has reached the end point, the mobile station has completed the test task.

Figure 10:
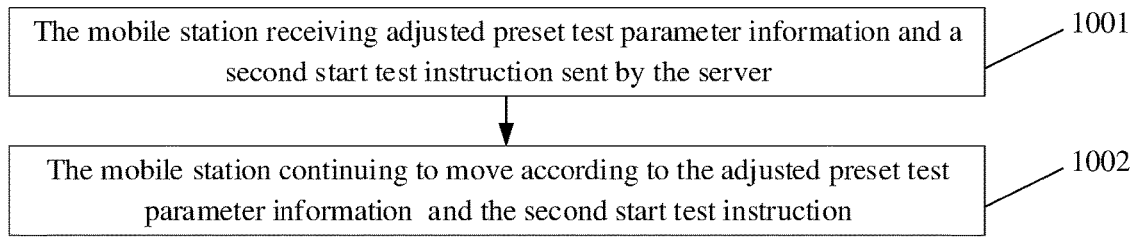
FIG. 10 is a flow diagram of a method for testing a coverage effect of a VHF communication base station according to another embodiment of the present application.

FIG. 10 is a flow diagram of a method for testing a coverage effect of a VHF communication base station according to another embodiment of the present application. As shown in FIG. 10, the method for testing the coverage effect of the VHF communication base station further includes the following steps.

1001: receiving, by the mobile station, adjusted preset test parameter information and a second start test instruction sent by the server.

As a corresponding terminal of the server in FIG. 3, a specific description may refer to a description of the method in FIG. 3, which will not be repeated here.

1002: continuing, by the mobile station, to move according to the adjusted preset test parameter information and the second start test instruction.

A specific description may refer to a description of the method in FIG. 3, which will not be repeated here.

Figure 11:
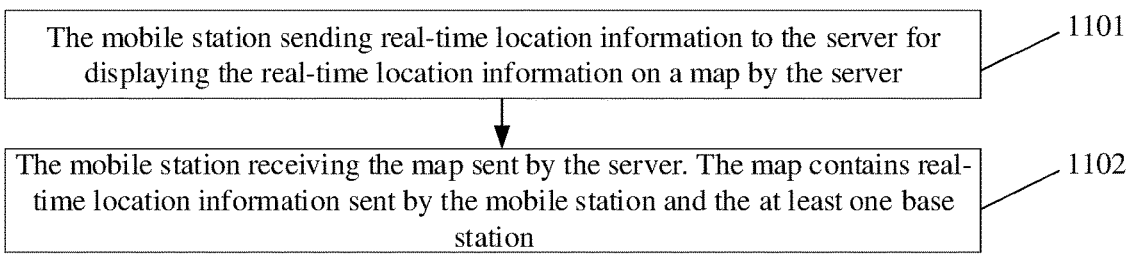
FIG. 11 is a flow diagram of a method for testing a coverage effect of a VHF communication base station according to another embodiment of the present application.

FIG. 11 is a flow diagram of a method for testing a coverage effect of a VHF communication base station according to another embodiment of the present application. As shown in FIG. 11, the method for testing the coverage effect of the VHF communication base station further includes the following steps.

1101: sending, by the mobile station, real-time location information to the server for displaying the real-time location information on a map by the server.

As a corresponding terminal of the server in FIG. 4, a specific description may refer to a description of the method in FIG. 4, which will not be repeated here.

1102: receiving, by the mobile station, the map sent by the server. The map contains real-time location information sent by the mobile station and the at least one base station.

A specific description may refer to a description of the method in FIG. 4, which will not be repeated here.

Figure 12:
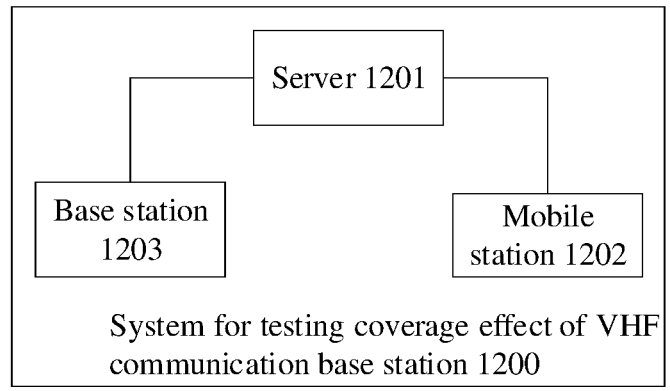
FIG. 12 is a schematic diagram of a system for testing a coverage effect of a VHF communication base station according to an embodiment of the present application.

FIG. 12 is a schematic diagram of a system for testing a coverage effect of a VHF communication base station according to an embodiment of the present application. As shown in FIG. 12, the system for testing a coverage effect of a VHF communication base station 1200 includes: a server 1201, a mobile station 1202, and at least one base station 1203.

The server 1201 is configured to: send preset test parameter information to a mobile station and send a first start test instruction to the mobile station and at least one base station, in which the preset test parameter information is a parameter for receiving or sending audio data to be tested, and the first start test instruction is used to instruct the mobile station and the at least one base station to start receiving or sending the audio data to be tested and location information corresponding to the audio data to be tested; and receive first audio data and first location information sent by the at least one base station, and second audio data and second location information sent by the mobile station. The first location information is information of a location where the at least one base station is when the at least one base station receives the first audio data, and the second location information is information of a location where the mobile station is when the mobile station receives the second audio data.

In an embodiment, the at least one base station includes a plurality of base stations, and the server 1201 is further configured to: perform the following steps for each of the multiple base stations: receiving the first audio data and the first location information sent by the base station; and receiving the second audio data and the second location information sent by the mobile station.

In an embodiment, the base station includes a shore station system, the mobile station includes a ship station system, and the server 1201 is further configured to: send the first audio data, the first location information, the second audio data and the second location information received to a management system, so that the management system scores the first audio data and the second audio data.

In an embodiment, the server 1201 is further configured to: send a preset moving route and a preset test time interval to the mobile station, so that the mobile station moves according to the preset moving route, and suspend the test according to the preset test time interval.

In an embodiment, the server 1201 is further configured to: adjust the preset test parameter information according to adjustment information input by a user; and send adjusted preset test parameter information and a second start test instruction to the mobile station.

In an embodiment, the server 1201 is further configured to: receive real-time location information sent by the mobile station for displaying the real-time location information on a map; and send the map to the mobile station and the at least one base station. The map containing the real-time location information sent by the mobile station and the at least one base station.

The mobile station 1202 is configured to: receive preset test parameter information and a first start test instruction sent by a server, in which the preset test parameter information is a parameter for receiving or sending audio data to be tested; move according to the preset test parameter information and the first start test instruction; send first audio data to at least one base station, and receive second audio data sent by the at least one base station; and send the second audio data and second location information to the server. The second location information is information of a location where the mobile station is when the mobile station receives the second audio data.

In an embodiment, the at least one base station includes a plurality of base stations, and the mobile station 1202 is further configured to: move and scan the plurality of base stations according to the preset test parameter information and the first start test instruction, and number the plurality of base stations which have been scanned, so that the plurality of base stations are tested separately according to the numbering. The sending first audio data to at least one base station, and receiving second audio data sent by the at least one base station includes the following steps. The following steps are cyclically executed according to the number of the plurality of base stations: determining whether there is an untested base station, if yes, sending the first audio data to the untested base station, and receiving the second audio data sent by the untested base station; if not, suspending the test.

In an embodiment, the mobile station 1202 is further configured to: determine whether an end point is reached according to the preset test parameter information; if not, continue to move according to the preset test parameter information, send the first audio data to the at least one base station, receive the second audio data sent by the at least one base station, and send the second audio data and the second location information to the server.

In an embodiment, the mobile station 1202 is further configured to: receive a preset moving route and a preset test time interval sent by the server. The mobile station moving according to the preset test parameter information and the first start test instruction includes: the mobile station moving according to the preset moving route when the mobile station receives the first start test instruction; and after the suspension test, the method includes: the mobile station starting the test again according to the preset test time interval.

In an embodiment, the mobile station 1202 is further configured to: receive adjusted preset test parameter information and a second start test instruction sent by the server; and continue to move according to the adjusted preset test parameter information and the second start test instruction.

In an embodiment, the mobile station 1202 is further configured to: send real-time location information to the server for displaying the real-time location information on a map by the server; and receive the map sent by the server. The map contains real-time location information sent by the mobile station and the at least one base station.

The at least one base station 1203 is configured to: receive a first start test instruction sent by a server and first audio data sent by a mobile station, send the first audio data and first location information to the server, in which the first location information is information of a location where the at least one base station is when the at least one base station receives the first audio data; and send second audio data to the mobile station. The first start test instruction is used to instruct to start receiving or sending audio data to be tested and location information corresponding to the audio data to be tested.

In an embodiment, the at least one base station 1203 is further configured to: send real-time location information to the server for displaying the real-time location information on a map by the server; and receive the map sent by the server. The map contains real-time location information sent by the mobile station and the at least one base station.

Figure 13:
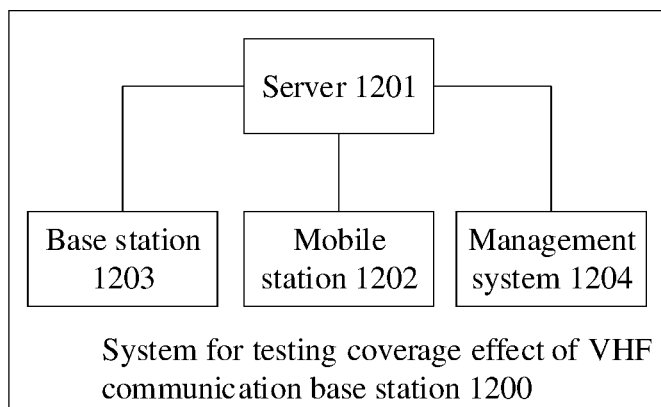
FIG. 13 is a schematic diagram of a system for testing a coverage effect of a VHF communication base station according to another embodiment of the present application.

FIG. 13 is a schematic diagram of a system for testing a coverage effect of a VHF communication base station according to another embodiment of the present application.

As shown in FIG. 13, the system for testing a coverage effect of a VHF communication base station 1200 further includes: a management system 1204 being configured to: receive the first audio data, the first location information, the second audio data and the second location information, so as to score the first audio data and the second audio data.

Figure 14:
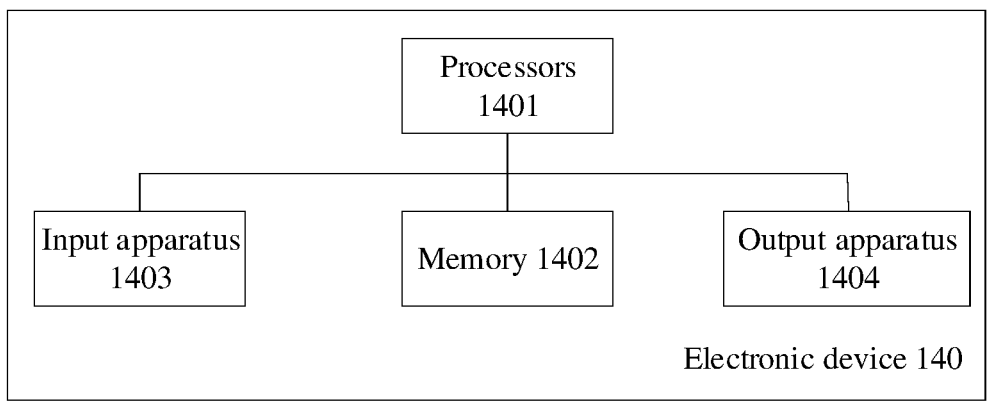
FIG. 14 is a schematic structural diagram of an electronic device according to an embodiment of the present application.

FIG. 14 is a schematic structural diagram of an electronic device according to an embodiment of the present application. As shown in FIG. 14, the electronic device 140 includes one or more processors 1401 and a memory 1402, and a computer program instruction stored in the memory 1402. When the computer program instructions are executed by the processor 1401, the processor 1401 executes the method for testing the coverage effect of the VHF communication base station according to any one of the above embodiments.

The processor 1401 may be a Central Processing Unit (CPU) or another form of processing unit with data processing capability and/or instruction execution capability, and may control another component in the electronic device to perform an expected function.

The memory 1402 may include one or more computer program products, which may include various forms of computer-readable storage media, such as a volatile memory and/or non-volatile memory. The volatile memory may include, for example, a Random Access Memory (RAM) and/or a cache (cache). The non-volatile memory may include, for example, a Read-Only Memory (ROM), a hard disk, and a flash memory. The compute-readable storage medium may store one or more computer program instructions, and the processor 1401 may run the program instructions to implement the method for testing the coverage effect of the VHF communication base station and/or other expected functions of the embodiments in the present application described above. The compute-readable storage medium may further store information, such as a test environment and a geographic location of the test, or the like.

In an example, the electronic device 140 may further include an input apparatus 1403 and an output apparatus 1404, and these components are interconnected by using a bus system and/or another form of connection mechanism (not shown in FIG. 14).

For example, when the electronic device is a ship, the input apparatus 1403 may be a transceiver for receiving the audio data sent by the base station and sending the audio data to the server. When the electronic device is a single unit device, the input apparatus 1403 may be a communication network connector for receiving a collected input signal from an external mobile device. In addition, the input apparatus 1403 may also include, for example, a keyboard, a mouse, a microphone, and so on.

The output apparatus 1404 may output various information to the outside. For example, it may include, for example, a display, a speaker, a printer, a communication network and a remote output device connected to it, and so on.

Certainly, for simplicity, only some of the components related to the present application in the electronic device are shown in FIG. 14, and components such as a bus, and an input/output interface are omitted. In addition, the electronic device 140 may further include any other suitable component depending on a specific application case.

In addition to the foregoing methods and devices, an embodiment of the present application may also be a computer program product that includes computer program instructions. When the computer program instructions are run by a processor, the processor is enabled to perform the steps of the method for testing the coverage effect of the VHF communication base station according to any one of the above embodiments.

The computer program product may write program code for performing the operations of the embodiments of the present application in any combination of one or more programming languages, and the programming languages include object-oriented programming languages such as Java and C++, and further include conventional procedural programming languages such as "C" or similar programming languages. The program code may be executed entirely on a user computing device, partly on a user device, as a stand-alone software package, partly on a user computing device while partly on a remote computing device, or entirely on a remote computing device or a server.

In addition, an embodiment of the present application may also be a computer-readable storage medium, in which the computer-readable storage medium stores computer program instructions. When the computer program instructions are run by a processor, the processor is enabled to perform the steps of the method for testing the coverage effect of the VHF communication base station according to the embodiments of the present application described in the "exemplary method for testing the coverage effect of the VHF communication base station methods" part of this specification.

The computer-readable storage medium may use any combination of one or more readable media. The readable medium may be a readable signal medium or a readable storage medium. The readable storage medium may include, for example, but not limited to, an electronic, magnetic, optical, electromagnetic, infrared, or semiconductor system, apparatus, or means, or any combination of the above. More specific examples (a non-exhaustive list) of the readable storage medium include: an electrical connection having one or more wires, a portable computer disk, a hard disk, a Random Access Memory (RAM), a Read-Only Memory (ROM), an Erasable Programmable Read-Only Memory (EPROM or a flash memory), an optical fiber, a portable Compact Disk Read-Only Memory (CD-ROM), an optical storage means, a magnetic storage means, or any suitable combination of the above.

The foregoing describes basic principles of the present application with reference to specific embodiments. However, it may be noted that the merits, advantages, effects, and the like mentioned in the present application are merely examples but not limitations, and cannot be considered that these merits, advantages, effects, and the like are essential to the embodiments of the present application. In addition, the specific details disclosed above are intended only for the purpose of illustration and convenience of understanding, and are not limited thereto, and are not intended to limit the present application to the specific details described above.

The block diagrams of components, apparatuses, devices and systems in the present application are merely illustrative examples and are not intended to require or imply that connections, arrangements and configurations must be performed in the manner shown in the block diagrams. As will be recognized by those skilled in the art, these components, apparatuses, devices and systems can be connected, arranged and configured in any manner. Terms such as "comprise", "include", "have" are open words, meaning "include but not limited to", and they can be used interchangeably. Terms "or" and "and" used herein refer to "and/or", and they can be used interchangeably unless the context expressly indicates otherwise. Term "such as" used herein refers to "such as but not limited to" and they can be used interchangeably.

It may also be noted that, in the apparatuses, devices and methods of the present application, components or steps can be decomposed and/or recombined. These decompositions and/or recombination shall be considered as equivalent solutions of the present application.

The foregoing descriptions of the disclosed aspects are provided to enable any person skilled in the art to make or use the present application. Modifications to these aspects are very obvious to those skilled in the art and the general principles defined herein can be applied to other aspects without departing from the scope of the present application. Therefore, the present application is not intended to be limited to the aspects shown herein, but to the widest extent consistent with the principles and novel features disclosed herein.

The foregoing descriptions have been given for the purposes of illustration and description. Furthermore, this description is not intended to limit the embodiments of the present application to the form disclosed herein. Although several exemplary aspects and embodiments have been discussed above, those skilled in the art will recognize some of their variations, modifications, changes, additions, and combinations.

The above embodiments only the preferred embodiments of the present application, and are not intended to limit the present application. Any modification, equivalent replacement, etc. made within the spirit and principles of the present application should be included in the scope of protection of the present application.

What is claimed is:

1. A method for testing a coverage effect of a Very High Frequency (VHF) communication base station, comprising:
    receiving, by a mobile station, preset test parameter information and a first start test instruction sent by a server, wherein the preset test parameter information is a parameter for receiving or sending audio data to be tested;
    moving, by the mobile station, according to the preset test parameter information and the first start test instruction;
    sending, by the mobile station, first audio data to at least one base station, and receiving second audio data sent by the at least one base station; and
    sending, by the mobile station, the second audio data and second location information to the server, wherein the second location information is information of a location where the mobile station is when the mobile station receives the second audio data;
    wherein the at least one base station comprises a plurality of base stations, and the moving according to the preset test parameter information and the first start test instruction comprises:
    moving and scanning the plurality of base stations according to the preset test parameter information and the first start test instruction, and numbering the plurality of base stations which have been scanned, so that the plurality of base stations are tested separately according to numbering;
    wherein the sending first audio data to at least one base station, and receiving second audio data sent by the at least one base station comprises:
    cyclically executing the following steps according to the number of the plurality of base stations;
    determining whether there is an untested base station;
    if yes, sending the first audio data to the untested base station, and receiving the second audio data sent by the untested base station;
    if not, suspending the test.

2. The method for testing the coverage effect of the VHF communication base station according to claim 1, wherein after the suspending the test, the method further comprises:
  determining, by the mobile station, whether an end point is reached according to the preset test parameter information;
  if not, continuing to move according to the preset test parameter information, sending the first audio data to the at least one base station, and receiving the second audio data sent by the at least one base station; and
  sending the second audio data and the second location information to the server.

3. The method for testing the coverage effect of the VHF communication base station according to claim 1, wherein:
  receiving, by the mobile station, preset test parameter information sent by a server comprises:
  receiving, by the mobile station, a preset moving route and a preset test time interval sent by the server;
  moving, by the mobile station, according to the preset test parameter information and the first start test instruction comprises:
  moving, by the mobile station, according to the preset moving route when the mobile station receives the first start test instruction; and
  after a suspension test, the method further comprises:
  starting, by the mobile station, the test again according to the preset test time interval.

4. The method for testing the coverage effect of the VHF communication base station according to claim 1, further comprising:
  receiving, by the mobile station, the adjusted preset test parameter information and a second start test instruction sent by the server; and
  continuing, by the mobile station, to move according to the adjusted preset test parameter information and the second start test instruction.

5. The method for testing the coverage effect of the VHF communication base station according to claim 1, further comprising:
  sending, by the mobile station, real-time location information to the server for displaying the real-time location information on a map by the server; and
  receiving, by the mobile station, the map sent by the server, wherein the map contains real-time location information sent by the mobile station and the at least one base station.

6. The method for testing the coverage effect of the VHF communication base station according to claim 1, wherein the mobile station comprises a berth system, the base station comprises a shore station system, and the first audio data and the second audio data is used to evaluate the VHF communication coverage effect of the mobile station, so as to assist a design of the VHF communication system.

7. An electronic device, comprising:
  a processor; and
  a memory storing a computer program instruction, wherein when the computer program instruction is executed by the processor, the processor executes the method for testing the coverage effect of the VHF communication base station according to claim 1.

8. A non-transitory computer readable storage medium storing a computer program instruction,
  wherein when the computer program instruction is executed by a processor, the processor executes the method for testing the coverage effect of the VHF communication base station according to claim 1.

9. A system of testing a coverage effect of a VHF communication base station, comprising:
  a server, configured to: send preset test parameter information to a mobile station and send a first start test instruction to the mobile station and at least one base station, wherein the preset test parameter information is a parameter for receiving or sending audio data to be tested, and the first start test instruction is used to instruct the mobile station and the at least one base station to start receiving or sending the audio data to be tested and location information corresponding to the audio data to be tested; and receive first audio data and first location information sent by the at least one base station, and second audio data and second location information sent by the mobile station, wherein the first location information is information of a location where the at least one base station is when the at least one base station receives the first audio data, and the second location information is information of a location where the mobile station is when the mobile station receives the second audio data;
  the mobile station, configured to: receive preset test parameter information and a first start test instruction sent by the server, wherein the preset test parameter information is a parameter for receiving or sending audio data to be tested; move according to the preset test parameter information and the first start test instruction; send first audio data to at least one base station, receive second audio data sent by the at least one base station; and send the second audio data and second location information to the server, wherein the second location information is information of a location where the mobile station is when the mobile station receives the second audio data;
  at least one base station, configured to: receive a first start test instruction sent by the server and first audio data sent by the mobile station, send the first audio data and first location information to the server, wherein the first location information is information of a location where the at least one base station is when the at least one base station receives the first audio data; and send second audio data to the mobile station, wherein the first start test instruction is used to instruct to start receiving or sending audio data to be tested and location information corresponding to the audio data to be tested; and
  a management system, configured to: receive the first audio data, the first location information, the second audio data and the second location information, so as to score the first audio data and the second audio data;
  wherein the at least one base station comprises a plurality of base stations, and the moving according to the preset test parameter information and the first start test instruction comprises:
  moving and scanning the plurality of base stations according to the preset test parameter information and the first start test instruction, and numbering the plurality of base stations which have been scanned, so that the plurality of base stations are tested separately according to numbering;
  wherein the sending first audio data to at least one base station, and receiving second audio data sent by the at least one base station comprises:
  cyclically executing the following steps according to the number of the plurality of base stations:
  determining whether there is an untested base station;

if yes, sending the first audio data to the untested base station, and receiving the second audio data sent by the untested base station;

if not, suspending the test.

* * * * *